United States Patent
Oishi

(10) Patent No.: US 7,758,362 B2
(45) Date of Patent: Jul. 20, 2010

(54) ROTARY CONNECTOR

(75) Inventor: Hiroshi Oishi, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 339 days.

(21) Appl. No.: 11/662,307

(22) PCT Filed: Sep. 6, 2005

(86) PCT No.: PCT/JP2005/016309

§ 371 (c)(1),
(2), (4) Date: Apr. 3, 2007

(87) PCT Pub. No.: WO2006/028076

PCT Pub. Date: Mar. 16, 2006

(65) Prior Publication Data

US 2008/0090436 A1    Apr. 17, 2008

(30) Foreign Application Priority Data

Sep. 10, 2004    (JP) ............... 2004-264620

(51) Int. Cl.
*H01R 3/00*    (2006.01)
(52) U.S. Cl. ..................... 439/164; 439/15
(58) Field of Classification Search ........... 439/164, 439/15, 13, 16
See application file for complete search history.

(56) References Cited

U.S. PATENT DOCUMENTS

| 5,630,723 A | 5/1997 | Kawamoto |
| 5,752,844 A | 5/1998 | Kawamoto |
| 5,772,146 A * | 6/1998 | Kawamoto et al. .......... 242/388 |
| 5,841,069 A | 11/1998 | Nagaoka et al. |
| 6,039,588 A * | 3/2000 | Osawa .................. 439/164 |
| 6,069,976 A | 5/2000 | Kim |
| 6,471,529 B2 | 10/2002 | Oishi |
| 6,508,655 B2 | 1/2003 | Kikkawa |
| 6,764,326 B2 | 7/2004 | Matsumoto et al. |

FOREIGN PATENT DOCUMENTS

| JP | 5-217649 | 8/1993 |
| JP | 7-19988 | 4/1995 |
| JP | 8-162240 | 6/1996 |
| JP | 9-134768 | 5/1997 |
| JP | 11-317273 | 11/1999 |
| JP | 2001-297846 | 10/2001 |
| JP | 2002-75574 | 3/2002 |
| JP | 2003-123927 | 4/2003 |

* cited by examiner

*Primary Examiner*—Xuong M Chung-Trans
(74) *Attorney, Agent, or Firm*—Jordan and Hamburg LLP

(57) ABSTRACT

A rotary connector apparatus includes a body supported fixedly, a rotor supported rotatably by the body and rotatable together with a steering wheel, a floating spacer disposed between the body and the rotor, rotatably floating according to rotation of the rotor, and having an inverting pass portion communicating between the inside and the outside in a radial direction, and a flat cable passing through the inverting pass portion to be inverted and wound on the sides of inner and outer peripheries of the floating spacer, a recessed portion provided with an outer peripheral face of the floating spacer so as to avoid hitting of the flat cable in a direction of a rotational axis of the floating spacer.

10 Claims, 3 Drawing Sheets

ROTARY CONNECTOR

BACKGROUND OF THE INVENTION

1. Field of the Invention

The present invention relates to a rotary connector apparatus applied to connect a vehicle body of an automobile and a steering wheel to each other electrically or the like.

2. Description of the Related Art

Figure 7:
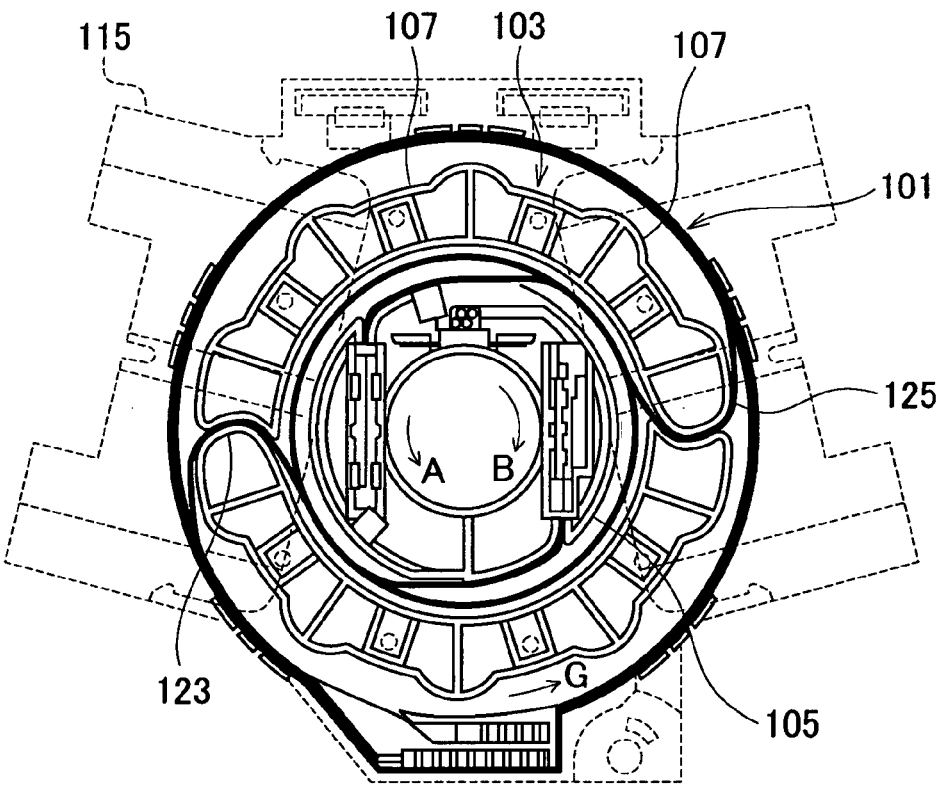
Figure 8:
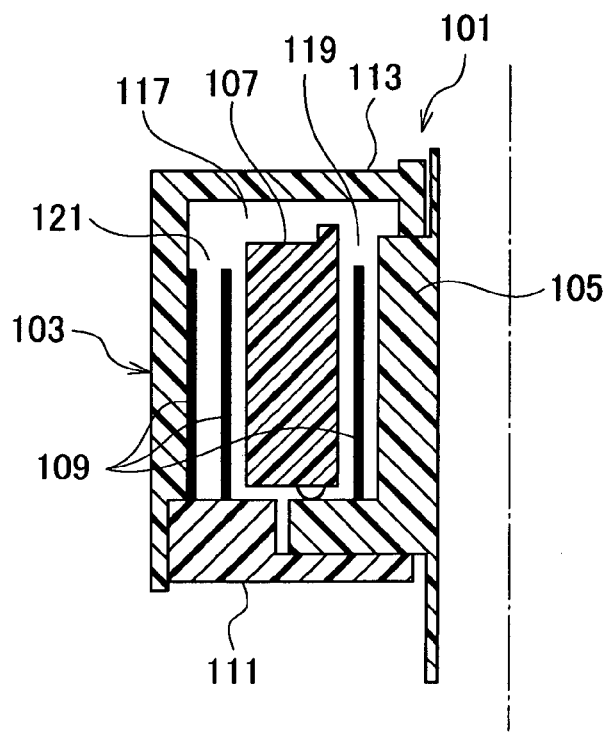

As a conventional rotary connector apparatus of this kind, there is such a rotary connector apparatus as shown in FIG. 7 and FIG. 8, for example. FIG. 7 is a sectional view of the rotary connector apparatus, taken along a direction perpendicular to a rotational axis thereof. FIG. 8 is a sectional view of the rotary connector apparatus, taken along a direction along the rotational axis, which complements FIG. 7. As shown in FIG. 7 and FIG. 8, a rotary connector apparatus 101 is mainly composed of a body 103, a rotor 105, a floating spacer 107, and a flat cable 109.

The body 103 includes a bottom cover 111 with which a case 113 is engaged. The bottom cover 111 is formed integrally with a combination switch base 115 fixed on a steering column (not shown). The rotor 105 is engaged with a lower face of a steering wheel, and rotated together with the steering wheel. The floating spacer 107 is rotatably provided in an accommodating space 117 between the rotor 105 and the body 103. The flat cable 109 is wound in a winding space 119 between the floating spacer 107 and the rotor 105 and a winding space 121 between the floating spacer 107 and the case 113. The flat cable 109 passes the winding space 121 from the winding space 119 through inverting pass portions 123 and 125. One end of the flat cable 109 is fixed on the rotor 105, and the other end thereof is fixed on the case 113.

Then, when steering operation is performed, the rotor 105 is rotated together with the steering wheel. According to this rotation, the one end of the flat cable 109 is caused to revolve together with the rotor 105.

When the rotor 105 is rotated in a direction of arrow A in FIG. 7, the flat cable 109 is wound around the rotor 105, and when the rotor 105 is rotated in a direction of arrow B in FIG. 7, the flat cable 109 is unwound. When the flat cable 109 is wound around the rotor 105, the flat cable 109 is pulled in the winding space 119 from the winding space 121 through the inverting pass portions 123 and 125. When the flat cable 109 is unwound from the rotor 105, the flat cable 109 is pulled out of the winding space 119 to the winding space 121 through the inverting pass portions 123 and 125.

In such a rotary connector apparatus 101, when steering operation is performed in a direction of unwinding the flat cable 109 from the rotor 105, the flat cable 109 is forced against an inner periphery of the body 103 to form a space between the flat cable 109 and the floating spacer 107. Then, when steering operation is performed in a direction of winding the flat cable 109 around the rotor 105, the flat cable 109 is pulled to the side of the winding space 119. At this time, the flat cable 109 is moved in a radial direction by the space between the flat cable 109 and the floating spacer 107 to hit against the floating spacer 107. Therefore, it is feared that hitting noise may be caused when the flat cable 109 hits against the floating spacer 107.

And, if the flat cable 109 acquires a bending inclination at the inverting pass portions 123 and 125, when the rotor 105 starts to be rotated in the direction of arrow B in FIG. 6, the flat cable 107 becomes difficult to be moved smoothly at the inverting pass portions 123 and 125 due to the bending inclination. Therefore, the inverting pass portions 123 and 125 of the floating spacer 107 receive a pressing force in a rotational direction at a portion of the bending inclination of the flat cable 109. Accordingly, the floating spacer 107 is forced to rotate together with the rotor 105 at the same speed. Therefore, the flat cable 109 hits against an outer peripheral face of the floating spacer 107 in the winding space 121 such that it is wound thereon, so that hitting noise may be caused. Such a conventional rotary connector is disclosed in Japanese Patent Application Publication No. 2001-297846.

SUMMARY OF THE INVENTION

A problem to be solved by the invention is that there is fear that abnormal noise due to hitting noise may be generated during steering operation.

MEANS FOR SOLVING THE PROBLEM

The present invention is mainly characterized by a recessed portion provided on an outer peripheral face of the floating spacer so as to avoid hitting of a flat cable against a floating spacer in a direction of a rotational axis, to suppress generation of abnormal noise.

EFFECT OF THE INVENTION

A rotary connector apparatus of the present invention has the recessed portion provided on the outer peripheral face of the floating spacer so as to avoid hitting of the flat cable in the direction of the rotational axis. Therefore, an area against which the flat cable hits can be made small when the flat cable hits against the outer peripheral face of the floating spacer such that it is wound thereon, so that generation of an abnormal noise can be suppressed.

The outer peripheral face of the floating spacer is provided with first and second guide faces which are different in distance in a radial direction with respect to the flat cable on both sides of the recessed portion in the direction of the rotational axis of the floating spacer. In this case, when the flat cable hits against the outer peripheral face, timings of hitting against the first and the second guide faces are different. Therefore, generation of abnormal noise can be suppressed more reliably.

The first and the second guide faces are different in distance in the radial direction due to a step or an inclination. In this case, the distances of the first and the second guide faces with respect to the flat cable in the radial direction can be made different reliably.

The rotating side member is provided with a rotation receiving portion for receiving the floating spacer on one side in an axial direction, and the first and the second guide faces are different in distance in the radial direction due to an inclination whose distance from a rotation center of the floating spacer becomes smaller toward the rotation receiving portion. In this case, when the flat cable hits against the first and the second guide faces, a component force directed to the side of the rotation receiving portion acts on the first and the second guide faces from the flat cable. Therefore, rotation of the floating spacer can be supported reliably by the rotation receiving portion without causing the floating spacer to move away from the rotation receiving portion. Accordingly, movement of the floating spacer in the direction of the rotational axis can be suppressed to prevent generation of abnormal noise.

The outer peripheral face of the floating spacer is provided with a projecting portion having a curved face for coming in slidable and partial contact with the flat cable in a peripheral direction, and the recessed portion is provided on the projecting portion. In this case, the flat cable can be brought in slidable contact with the projecting portion, so that friction resistance can be reduced.

DETAILED DESCRIPTION OF THE DRAWINGS

Figure 1:
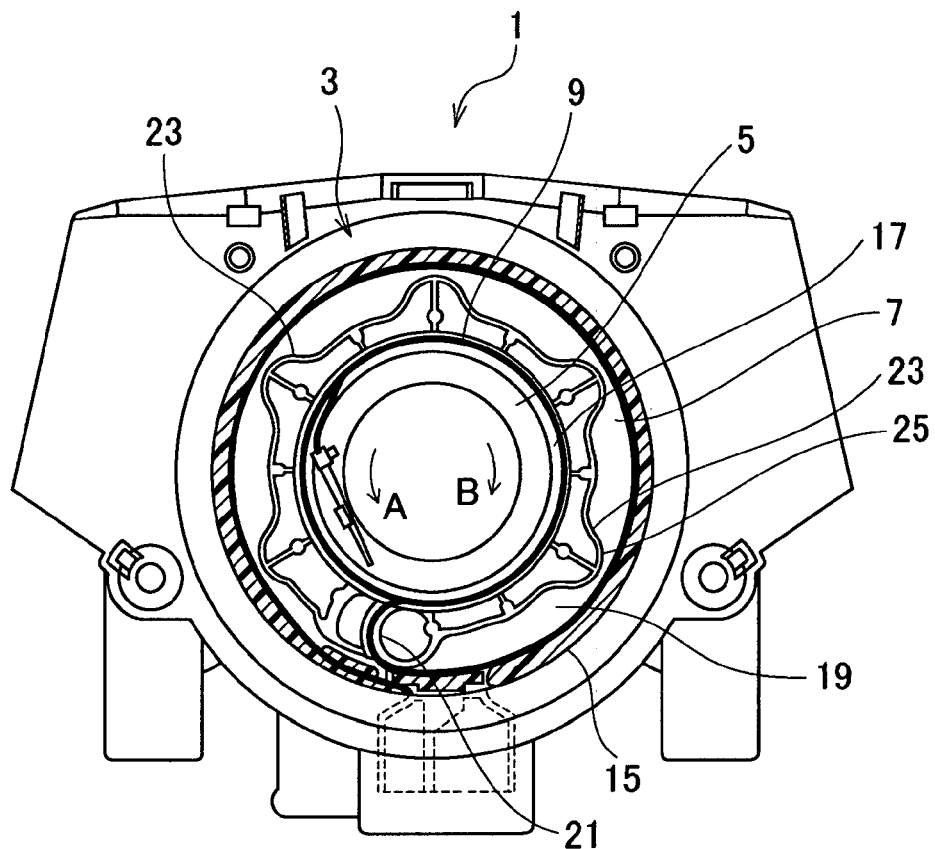
Figure 2:
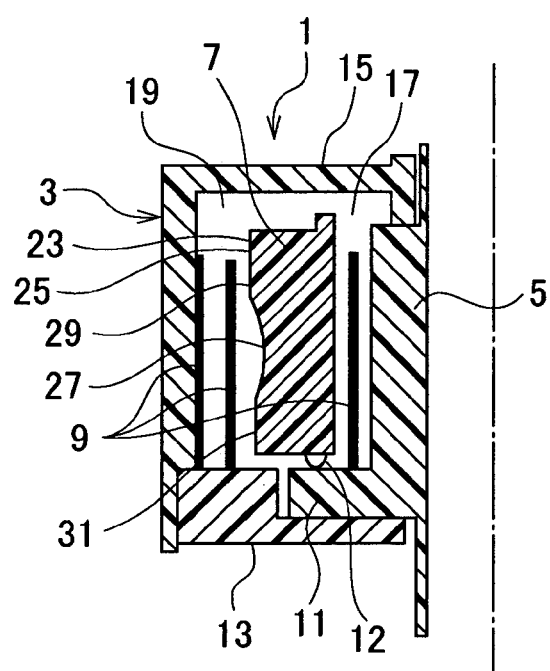
Figure 3:
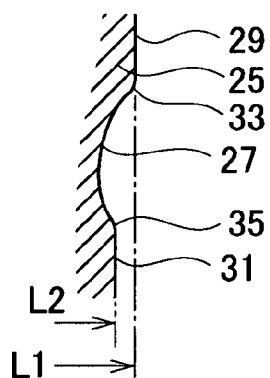
Figure 4:
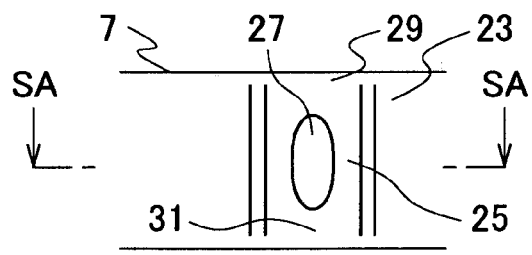
Figure 5:
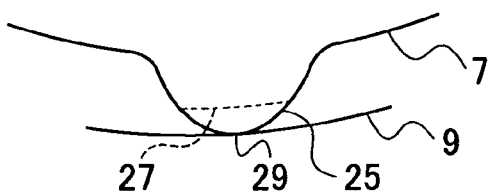

FIG. 1 It is a sectional view of a rotary connector apparatus in a direction perpendicular to a rotational axis thereof (a first embodiment);

FIG. 2 It is a sectional view of the rotary connector apparatus in a direction along the rotational axis (the first embodiment);

FIG. 3 It is an enlarged sectional view of a main portion (the first embodiment);

FIG. 4 It is a side view of a main portion of a floating spacer viewed from a radial direction (the first embodiment);

FIG. 5 It is a sectional view taken along a line SA-SA in FIG. 4 (the first embodiment);

FIG. 6 (*a*) is a sectional view of a main portion according to a first modified example, and (*b*) is a sectional view of a main portion according to the second modified example (the first embodiment);

FIG. 7 It is a sectional view of a rotary connector apparatus in a direction perpendicular to a rotational axis thereof (conventional example); and FIG. 8 It is a sectional view of the rotary connector apparatus in a direction along the rotational axis (conventional example).

DETAILED DESCRIPTION OF THE INVENTION

An object of suppressing generation of an abnormal noise is achieved by providing a recessed portion.

Embodiment 1

FIG. 1 is a sectional view of a rotary connector apparatus in a direction perpendicular to a rotational axis thereof according to a first embodiment of the present invention, FIG. 2 is a sectional view thereof in a direction along the rotational axis, FIG. 3 is an enlarged sectional view of a main portion, FIG. 4 is a side view of a main portion of a floating spacer viewed from a radial direction of a floating spacer, and FIG. 5 is a sectional view taken along a line arrow SA-SA in FIG. 4. A rotary connector apparatus 1 shown in FIG. 1 and FIG. 2 electrically connects a required apparatus on the side of a steering wheel of an automobile and a power supply on the side of a vehicle body thereof to each other.

As shown in FIG. 1 and FIG. 2, the rotary connector apparatus 1 basically has a constitution similar to the rotary connector apparatus 101 in FIG. 7, so that the rotary connector apparatus 1 mainly includes a body 3, a rotor 5, a floating spacer 7, and a flat cable 9.

The rotor 5 is provided with a flange-like rotation receiving portion 11, and the floating spacer 7 is provided with a protrusion 12 supported and abutting on the rotation receiving portion 11. By the protrusion 12 supported and abutting on the rotation receiving portion 11, one end side of the floating spacer 7 in a direction of a rotational axis thereof is supported. According to this embodiment, the floating spacer 7 is supported by the rotation receiving portion 11 along the rotational axis on its lower side away from the steering wheel.

The body 3 includes a bottom cover 13 with which a case 15 is engaged. The flat cable 9 is wound in a winding space 17 between the floating spacer 7 and the rotor 5 and a winding space 19 between the floating spacer 7 and the case 15. The flat cable 9 passes the winding space 19 from the winding space 17 through an inverting pass portion 21 of the floating spacer 7. One end of the flat cable 9 is fixed on the rotor 5, and the other end thereof is fixed on the case 15.

Therefore, the rotary connector apparatus 1 includes a fixed side member (body 3), a rotating side member (rotor 5), the floating spacer 7, a flat cable and a recessed portion. The fixed side member (body 3) is supported fixedly. The rotating side member (rotor 5) is rotatably supported by the fixed side member (body 3) and is rotatable together with a rotating side (steering wheel). The floating spacer 7 is disposed between the fixed side member (body 3) and the rotating side member (rotor 5) and having an inverting pass portion 21 communicating between the inside and the outside in a radial direction. The floating spacer 7 floats and rotates according to rotation of the rotating side member (rotor 5). The flat cable 9 passes through the inverting pass portion 21 of the floating spacer 7 to be inverted, and is wound on the sides of inner and outer peripheries (the winding space 17 and the winding space 19) of the floating spacer 7.

The floating spacer 7 is provided with a projecting portion 25 on an outer peripheral face 23. The projecting portion 25 is for coming in slidable and partial contact with the flat cable 9 in a circumferential direction. The projecting portion 25 extends along the direction of the rotational axis and is formed to have a curved face, for example, a semicircle in section in a direction perpendicular to the rotational axis. A plurality of the projecting portions are provided at predetermined intervals in a rotational direction.

The outer peripheral face 23 of the floating spacer 7 is provided with a recessed portion 27 so as to avoid hitting of the flat cable. The recessed portion 27 is provided at a central portion of the projecting portion 25 in the rotational direction as well as the direction of the rotational axis of the floating spacer 7. A shape of the recessed portion 27 can be freely set. According to this embodiment, the recessed portion 27 is curved in a direction along the rotational axis in sections in FIG. 2 and FIG. 3. The recessed portion 27 has an elliptical shape when viewed from the radial direction in FIG. 4.

The outer peripheral face 23 of the floating spacer 7 further includes first and second guide faces 29 and 31. The first and the second guide faces 29 and 31 are provided on both sides of the recessed portion 27 in the direction of the rotational axis of the floating spacer 7. The first and the second guide faces 29 and 31 are set such that distances L1 and L2 with respect to the flat cable 9 in the radial direction are different from each other, so that timings of hitting against the flat cable 9 are different.

The first and the second guide faces 29 and 31 extend along the rotational axis of the floating spacer 7, and are set such that the distances L1 and L2 in the radial direction are different from each other due to a step formed between the first and the second guide faces 29 and 31.

Between the recessed portion 27, and the first and the second guide faces 29 and 31, smooth rounded corners 33 and 35 are provided.

Next, operation of the rotary connector apparatus will be explained.

General operation is similar to the conventional operation explained in FIG. 7 and FIG. 8, so that the rotor 5 in FIG. 1 is rotated together with the steering wheel according to steering operation. When the flat cable 9 is wound around the rotor 5 according to rotation of the rotor 5 in a direction of arrow A in FIG. 1, the flat cable 9 is pulled in the winding space 17 from the winding space 19 through the inverting pass portion 21. When the flat cable 9 is unwound from the rotor 5 according to rotation of the rotor 5 in a direction of arrow B in FIG. 1, the flat cable 9 is pulled out of the winding space 17 to the winding space 19 through the inverting pass portion 21.

In such a rotary connector apparatus 1, since a space is formed between the flat cable 9 and the floating spacer 7, or the flat cable 9 acquires a bending inclination at the inverting pass portion 21 when steering operation is performed in a direction of unwinding the flat cable 9 from the rotor 5. According to the formation of the space or the bending inclination, the flat cable 9 hits against the outer peripheral face 23 of the floating spacer 7 during the steering operation as described above.

At this time when the flat cable 9 hits against the outer peripheral face 23 of the floating spacer 7 in a winding manner, according to this embodiment, an area of the hitting can be made small with the recessed portion 27 so as to avoid hitting against the flat cable 9 provided on the outer peripheral face 23 of the floating spacer 7. Therefore, hitting noise can be made small or generation of hitting noise can be eliminated.

According to this embodiment, the projecting portion 25 provided on the outer peripheral face 23 of the floating spacer 7 has a curved face for coming in slidable and partial contact with the flat cable 9 in the peripheral direction. Therefore, slide resistance occurring when the flat cable 9 comes in slidable contact with the outer peripheral face 23 of the floating spacer 7 can be reduced. By providing the recessed portion 27 on the projecting portion 25, the slide resistance can be reduced synergistically.

The distances L1 and L2 to the flat cable 9 in the radial direction are different from each other in the first and the second guide faces 29 and 31. When the flat cable 9 hits against the outer peripheral face 23, timings are different such that the flat cable 9 hits against the first guide face 29 in first, and then hits against the second guide face 31. Therefore, even if hitting noise is generated due to that the flat cable 9 hits against the first and the second guide faces 29 and 31, each area of the hitting is small and timings of generation of the hitting noise are different. As this result, hitting noise can be made small reliably.

Since the first and the second guide faces 29 and 31 are set such that the distances L1 and L2 in the radial direction are different due to a step formed between the first and the second guide faces 29 and 31. The distances L1 and L2 of the first and the second guide faces 29 and 31 to the flat cable 9 in the radial direction can be made different reliably.

Figure 6A:
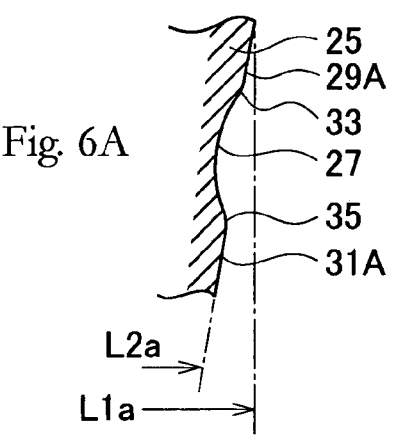
Figure 6B:
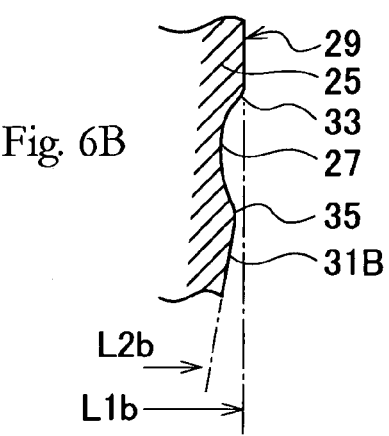

FIGS. 6A and 6B show modified examples of the first and the second guide faces 29 and 31, in which FIG. 6A is an enlarged sectional view of a main portion of a first modified example, and FIG. 6B is an enlarged sectional view of a main portion of a second modified example.

First and second guide faces 29A and 31A in FIG. 6A are set such that distances L1$a$ and L2$a$ in the radial direction are different from each other due to an inclination. The first guide face 29 and a second guide face 31B in FIG. 6B are set such that distances L1$b$ and L2$b$ in the radial direction are different from each other due to a slight step between the first and the second guide faces 29 and 31B and an inclination of the second guide face 31B.

Incidentally, in FIGS. 6A and 6B, though the distances L1$a$, L2$a$ and L2$b$ vary according to differences of inclined positions of the first and the second guide faces 29A and 31A, and the second guide face 31B, respectively. Therefore, the distances L1$a$, L2$a$ and L2$b$ do not mean to represent specific distances, but they simply represent a distance varies at inclined positions due to inclination.

In the modified examples in FIGS. 6A and 6B, even if hitting noise is generated due to that the flat cable 9 hits against the first and the second guide faces 29A and 31A or the first and the second guide faces 29 and 31B, each area of the hitting is small and timings of generation of the hitting noise are different between the respective faces. Therefore, hitting noise can be made small similarly and reliably.

According to this embodiment, by the protrusion 12 supported and abutting on the rotation receiving portion 11 of the rotor 5, one end side of the floating spacer 7 in the direction of the rotational axis is supported. Therefore, behavior of the floating spacer 7 rotating in the body 3 is stable, and sliding can also be reduced.

In this case, the inclinations of the first and the second guide faces 29A and 31A in FIG. 6A and the inclination of the second guide face 31B in FIG. 6B are set such that the distances L1$a$ and L2$a$ or the distances L1$b$ and L2$b$ in the radial direction are different from each other due to the inclination where a distance from the rotational center of the floating spacer 7 becomes smaller toward the rotation receiving portion 11.

Therefore, when the flat cable 9 hits against the first and the second guide faces 29A and 31A in FIG. 6A or the second guide face 31B in FIG. 6B, a component force directed to the rotation receiving portion 11 side acts on the first and the second guide faces 29A and 31A or the second guide face 31B from the flat cable 9. Therefore, rotation of the floating spacer 7 can be rotatably supported reliably by the rotation receiving portion 11 without causing the floating spacer 7 to move away from the rotation receiving portion 11.

Both the first and the second guide faces 29A and 31A are inclined, both the faces 29A and 31A can force the floating spacer 7 against the rotation receiving portion 11.

In the above-described embodiment, the projecting portion 25 is provided on the floating spacer 7. In contrast, the projecting portion may be omitted and the recessed portions may be provided on a flat outer peripheral face of the floating spacer 7 sequentially or at intervals in the peripheral direction.

The invention claimed is:

1. A rotary connector apparatus, comprising:
a fixed side member supported fixedly;
a rotating side member rotatably supported by the fixed side member and rotatable together with another rotating side member;
a floating spacer disposed between the fixed side member and the rotating side member and rotatably floating according to rotation of the rotating side member, the floating spacer having an inverting pass portion communicating between the inside and the outside in a radial direction;
a flat cable passing through the inverting pass portion of the floating spacer to be inverted and wound on the sides of inner and outer peripheries of the floating spacer; and
an outer peripheral face of the floating spacer including a recessed portion centrally located in a direction of a rotational axis of the floating spacer to provide an area substantially not in contact with the flat cable so as to avoid hitting of the flat cable, and further including first and second guide faces providing first and second respective contact surfaces against which the flat cable hits, and which are disposed on both sides of the recessed portion in the direction of the rotational axis of the floating spacer.

2. The rotary connector apparatus of claim 1, wherein the first and second guide faces have different distances in the radial direction due to a step in the radial direction or an inclination.

3. The rotary connector apparatus of claim 2, further comprising:

a rotation receiving portion provided with the rotating side member, for receiving the floating spacer on one side in an axial direction; and the first and the second guide faces having different distances in the radial direction due to an inclination where a distance from a rotational center of the floating spacer becomes smaller toward the rotation receiving portion.

4. A rotary connector apparatus, comprising:

a fixed side member supported fixedly;

a rotating side member rotatably supported by the fixed side member and rotatable together with another rotating side member;

a floating spacer disposed between the fixed side member and the rotating side member and rotatably floating according to rotation of the rotating side member, the floating spacer having an inverting pass portion communicating between the inside and the outside in a radial direction;

a flat cable passing through the inverting pass portion of the floating spacer to be inverted and wound on the sides of inner and outer peripheries of the floating spacer;

an outer peripheral face of the floating spacer including a recessed portion centrally located in a direction of a rotational axis of the floating spacer so as to avoid hitting of the flat cable; and first and second guide faces provided with the outer peripheral face of the floating spacer on both sides of the recessed portion in a direction of a rotational axis of the floating spacer, the first and second guide faces having different distances in a radial direction with respect to the flat cable.

5. The rotary connector apparatus of claim 4, wherein the first and second guide faces have different distances in the radial direction due to a step in the radial direction or an inclination.

6. The rotary connector apparatus of claim 5, further comprising:

a rotation receiving portion provided with the rotating side member, for receiving the floating spacer on one side in an axial direction; and the first and the second guide faces having different distances in the radial direction due to an inclination where a distance from a rotational center of the floating spacer becomes smaller toward the rotation receiving portion.

7. A rotary connector apparatus, comprising:

a fixed side member supported fixedly;

a rotating side member rotatably supported by the fixed side member and rotatable together with another rotating side member;

a floating spacer disposed between the fixed side member and the rotating side member and rotatably floating according to rotation of the rotating side member, the floating spacer having an inverting pass portion communicating between the inside and the outside in a radial direction;

a flat cable passing through the inverting pass portion of the floating spacer to be inverted and wound on the sides of inner and outer peripheries of the floating spacer;

a recessed portion provided with an outer peripheral face of the floating spacer so as to avoid hitting of the flat cable;

a projecting portion provided with the outer peripheral face of the floating spacer and having a curved face for coming in slidable and partial contact with the flat cable in a circumferential direction; and the recessed portion provided on the projecting portion.

8. The rotary connector apparatus of claim 7, further comprising:

first and second guide faces provided with the outer peripheral face of the floating spacer on both sides of the recessed portion in a direction of a rotational axis of the floating spacer, the first and second guide faces having different distances in a radial direction with respect to the flat cable.

9. The rotary connector apparatus of claim 8, wherein the first and second guide faces have different distances in the radial direction due to a step in the radial direction or an inclination.

10. The rotary connector apparatus of claim 9, further comprising:

a rotation receiving portion provided with the rotating side member, for receiving the floating spacer on one side in an axial direction; and the first and the second guide faces having different distances in the radial direction due to an inclination where a distance from a rotational center of the floating spacer becomes smaller toward the rotation receiving portion.

\* \* \* \* \*